Dec. 24, 1968          E. E. SHELDON          3,417,745
           FIBER ENDOSCOPE PROVIDED WITH FOCUSING MEANS
                    AND ELECTROLUMINESCENT MEANS
Filed Aug. 23, 1963                          4 Sheets-Sheet 1
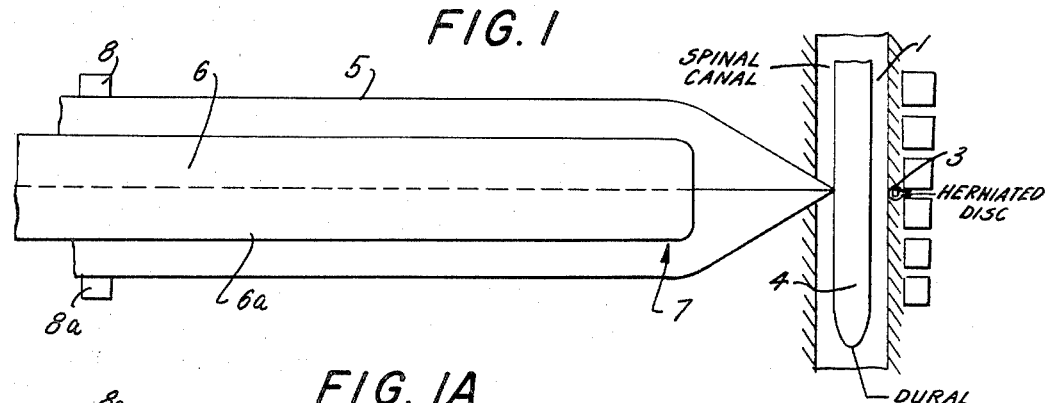
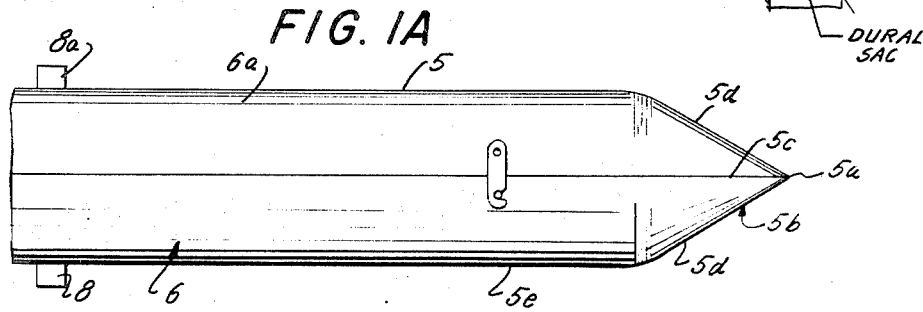
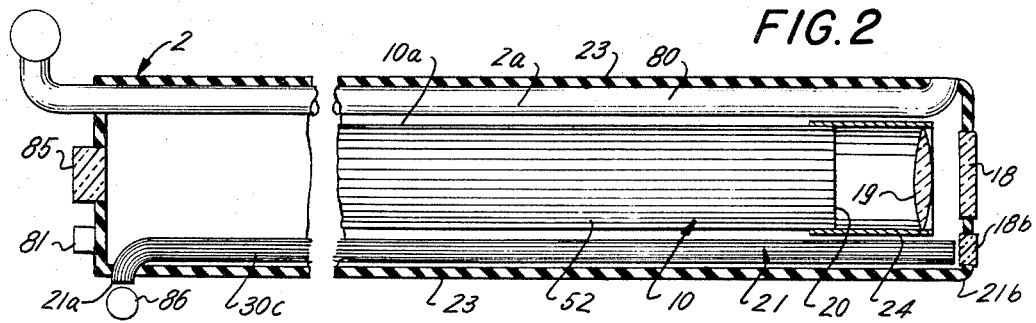
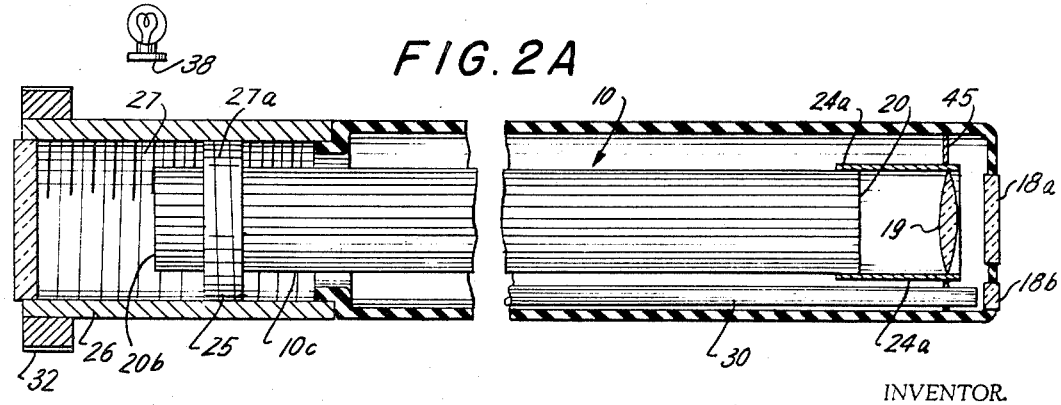
INVENTOR.
EDWARD EMANUEL SHELDON
BY
L. S. Saulsbury
ATTORNEY

SOURCE OF ELECTRICAL POWER

- 62 CONDUCTING LAYER
- 63 DIELECTRIC
- 60 PHOSPHOR IN DIELECTRIC
- 61 LIGHT TRANSPARENT CONDUCTING LAYER
- 64 LIGHT TRANSPARENT INSULATING

INVENTOR.
EDWARD EMANUEL SHELDON
BY
*L. S. Saulebury*
ATTORNEY

Dec. 24, 1968  E. E. SHELDON  3,417,745
FIBER ENDOSCOPE PROVIDED WITH FOCUSING MEANS
AND ELECTROLUMINESCENT MEANS
Filed Aug. 23, 1963  4 Sheets-Sheet 4

INVENTOR.
EDWARD EMANUEL SHELDON
BY
L. S. Saulsbury
ATTORNEY

3,417,745
FIBER ENDOSCOPE PROVIDED WITH FOCUSING MEANS AND ELECTROLUMINESCENT MEANS
Edward Emanuel Sheldon, 30 E. 40th St., New York, N.Y. 10016
Filed Aug. 23, 1963, Ser. No. 304,053
14 Claims. (Cl. 128—6)

ABSTRACT OF THE DISCLOSURE

This invention relates to new endoscopic instruments which can transport the image of the examined part to the observer through tortuous passages regardless of the angulation of said part or of said passages. This device is further characterized by having means for image focusing which produce the focusing motion at the proximal end of the endoscope. In some devices illumination of the examined part is provided by flexible electroluminescent means attached to walls of said endoscope.

---

This invention relates to a novel instrument for examination of the interior of the parts, channels or passages which are inaccessible to the examiner and has a common subject matter with my U.S. Patent 3,021,834 filed Nov. 28, 1956, and issued on Feb. 20, 1962; and with U.S. Patent 3,279,460 filed Dec. 4, 1961, and issued on Oct. 18, 1966. Due to the inability of light to bend around the corners, the present instruments used for such examinations have to be straight and rigid so that the eye of the examiner and the examined part are in one straight line. The instruments using optical lenses or prisms will not help in the situation when the shape and the size of the examined part is variable and unknown in advance. In such a case, the position of the curves and angulations in the examined parts or passages is unknown and therefore the lenses or prisms cannot be positioned to anticipate deviations of the axis of the examined channel from the straight line.

The purpose of this invention is to provide means for inspection of inaccessible channels, such as hollow parts of machinery or of other inaccessible passages. My device may be introduced inside of a part which cannot be inspected visually without dismantling or destroying the whole machine and will transmit the image of said part to the observer outside of said part. My invention will be especially useful for the examination of coils and pipes or other curved structures. My device can also be used as a probe to be inserted into a solid object and to transmit information about its internal structure.

The main purpose of this invention is to provide means for the diagnosis of a herniated ("slipped") intervertebral disc. At present the diagnosis depends on the results of X-ray examination which is reliable only in 50–75% of cases. In view of the fact that an operation for the disc is a very serious procedure it is important to provide a reliable preoperative diagnosis, so that no surgery shall be done without a definite knowledge as to whether the patent suffers from a herniated disc or not. At present it happens quite often that the surgeon does not find the disc which according to the X-rays was supposed to be out of its normal place. On the other hand many patients are not referred for operation because the X-rays failed to visualize the herniated disc. My spinal fiberscope which may be also called a spinescope will solve this problem by presenting a visual image of the herniated disc which is much more reliable than the X-ray shadow image. The purpose of this invention cannot be accomplished with one instrument in all of the patients because of the great variability of the human anatomy and of pathological conditions encountered in examination. Many modifications of the spinescope may be necessary to accomplish the best results and therefore many embodiments of the spinescope will be described in detail below. It should be understood that inventive features of my spinescope may be applied interchangeably in various embodiments of the novel spinescope even if it is not stated so while describing the particular drawing.

It should be also understood that my device may be used for examinations of other organs as well.

In the drawings:

FIGURE 1 shows the spinal needle and the spinescope in the spinal canal.

FIGURE 1A shows the construction of the novel spinal needle.

FIGURE 2 shows spinescope with "end-on" forward viewing optical system.

FIGURE 2A shows a modification of the spinescope having novel focusing means.

Figure 2B:
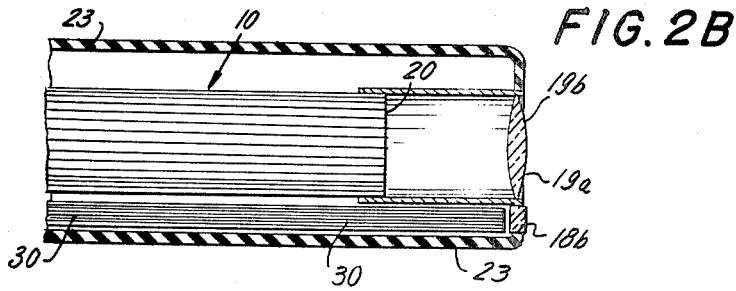
FIGURES 2B and 2C shows a modification of the optical system of the spinescope.

FIGURE 1 shows the cross section of the spinal canal 1, dural sac 4, the position of the needle 5 and spinescope 7 and the herniated disc 3.

The new device which may be called the spinescope is shown in FIGURE 2. The handle 2 is a hollow tube, the handle may be rigid or semi-flexible or completely flexible according to the part to be examined. At the end of the handle begins the flexible part 2a of the spinescope which has width and length suitable for the size of the examined part. In case the spinescope is used for examination of fragile parts, the part 2a must be very flexible and pliable in order to avoid damage to the wall of the examined part. The basic feature of the material for the housing for the flexible part of the spinescope is therefore that it must be easily bent and molded by the walls of the passages in which it is being introduced. Such material may be a suitable plastic, or rubber 23. In some cases the housing 23 and covering are provided by the same layer of material. Sometimes two different layers of different materials will serve better for this purpose. If the covering and housing are made of an elastic material such as rubber, neoprene or a suitable plastic, it may be necessary to reenforce it at the sites of the attachment of supporting members for internal structures of the spinescope by more rigid inserts to provide a better stability for said internal structures. In case the spinescope is used for investigation of sturdy parts or of machinery the part 2a may be obviously more rigid. The housing for the flexible part 2a of the spinescope may be made also of the stainless steel spiral sheet designed not only for durability but also to maintain the proper degree of flexibility and elasticity. The metal spiral is tapered to insure its uniform bending. In case the spinescope is used as a probe for insertion into a solid object the tip should be preferably rigid and sharply pointed to be able to pierce the examined object. In some cases the tip 3 is provided with one or more windows at its end to transmit the light to the examined part and to receive the image of said part. The tip may also have a hemi-spherical or other shape.

FIGURE 1A shows the novel spinal needle 5 which will be inserted into the spinal canal 1. The needle 5 may have a gauge of 2–3 millimeters for housing in its lumen the novel spinescope 7. The shaft 5e of the needle terminates a few millimeters before the distal point of the needle 5a. Therefore the tip 5b consists only of the bottom wall 5c and side-walls 5d and has no closing wall above the bottom wall 5c. After the needle has been inserted, spinescope 7 is introduced into the lumen of the needle and is pushed into it until its distal end reaches the end of the needle 5b. This is done under visual control and the examiner will see the grey shadow of dura (which is the outer covering of the spinal sac) when the spinescope enters the spinal canal. As shown in the drawing 1, the herniated disc 3 is usually located on the opposite side of the spinal canal 1 and usually cannot be seen at this time. The needle 5 has the construction which allows enlargement of its lumen when necessary. The shaft 5e is cut through one of its walls creating thereby two valve-like half-walls 6 and 6a with are locked together at the proximal end of the needle outside of the examined body. The locking mechanism for the half-walls may be of any type known in the art such as a releasable tongue in the valve 6 fitting into an opening in the valve 6a or a slideable pin which can be inserted into hinges or rings in each half-wall. If the examination requires a spinescope of a larger diameter than one which needle 5 can accommodate, the shaft of the needle 5e is unlocked and both half-walls 6 and 6a are spread apart by applying manually pressure to the handles 8 and 8a as much as anatomical conditions will allow. Then the half-walls may be locked again in the new position and a spinescope of a larger diameter can be then inserted into the new enlarged lumen of the needle.

The novel spinescope 7, shown in FIGURE 2, is provided with the viewing apparatus which comprises an image conductor such as a bundle of fibers 10 and an optical system 19.

The image conductor 10 consists of multiple fibers of material having a high refractive index such as quartz, glass, rutile or special plastics. In many applications the image conductor must be flexible and easily malleable. In such cases acrylic plastics such as Lucite or polystyrenes may be used. Especially Lucite is suitable for this purpose because it causes smaller losses of conducted light than other materials. Lucite and other above mentioned materials characterized by a high refractive index have the property of internal reflection of the light conducted by them. Such materials cannot conduct a whole image as such but they can conduct well a light signal, it means an image point. The size of the image point I found is determined by the diameter of a single conducting fiber 52. In my image conductor I assembled a bundle of such fibers which form a mosaic-like end-faces and which therefore can conduct plurality of image points. All these image points will reproduce at the other end-face of the image conductor the original image provided that the image conducting fibers remain in their original spatial relationship. Each fiber should have, as was explained above, a diameter corresponding to the size of one image point. The diameter of 0.1 millimeter is well suitable for the purposes of my invention. In order to conduct an image of an area, e.g. of one square centimeter we must have many fibers, the number of fibers being dependent on the resolution of reproduced image that we desire.

The light conducting fibers should be polished on their external surface very exactly. They may be also preferably coated with a very thin light opaque layer such as of aluminum or carbon which should have a lower index of refraction than the light conducting fiber itself. Such coating may have a thickness of only a few microns. I found a great improvement of flexibility of the light conductor 10 can be obtained by having the light conducting fibers glued together only at their end-faces 20 and 20b. This is a very important feature of my device because the main requirement from the light conductor 10 is its flexibility and malleability. If the fibers are glued together along their entire length the flexibility and malleability is so much reduced that it may not be possible to use it in many examinations in which the walls or passages are fragile and may be damaged by a rigid instrument. I found unexpectedly that having the conducting fibers free along their path between the end-faces will not cause any deterioration of the conducted image. I found that in spite of the fact that fibers between their end surfaces were freely movable there was no blurring of the conducted image. It must be understood, however, that the fibers 52 at both end-faces of the conductor 10 must rigidly maintain their spatial relationship. Another important feature of this construction is that the diameter of the light conductor 10 can be now increased because no space consuming binder or glue is present between the fibers 52 except at their end-faces. Instead of using the binder at the end-faces of fibers 52, they may also be held together at their end-faces by a fine mesh screen. Each fiber is threaded through one opening of said mesh screen and is being held by said screen in constant position.

It may be added that smaller losses of light may be obtained if the fibers 52 are hollow inside instead of being solid. An improvement in contrast of conducted images can be obtained by coating light conducting fibers 52 with an opaque material which eliminates the leakage of light from one fiber to the adjacent one. Sometimes the coating of a low index of refraction for the fibers should be preferably of a light transparent material such as of a suitable glass or of plastics. Sometimes the light opaque layer such as of aluminum or carbon is placed in addition outside of the light transparent coating.

The number of fibers that can be used in many examinations will be limited by the diameter of the passages through which my spinescope has to pass. As in many situations the channel may be only 1–2 cm. wide it will be impossible to use a great number of fibers. I succeeded to overcome this limitation, by using in combination the light conductor 10 with a demagnifying optical system 19. By the use of the demagnifying optical system I can reduce the examined field to the diameter of the image conductor 10. If the optical system will demagnify the image five times, I can examine the field having 25 cm.$^2$ with the image conductor having the diameter of only 1 cm.$^2$. This combination represents a very important feature of my invention as it is not always practical or feasible to limit the examined field only to the diameter of the image conductor. Another important feature of my optical system 19 is that it allows to project the image on the end-face 20 of the light image conductor from which it can be transmitted to the other end of the conductor. If the image were projected on the side of the conductor 10 instead of on its end-face, it would not be conducted at all.

The light image conductor 10 may be introduced into an examined part simultaneously with the spinescope. In some cases it is preferable to introduce my spinescope first and then insert the image conductor 10 into spinescope. In some cases the whole optical system may be attached to the end-face of the image conductor to make one unit.

The bundle of fibers 10 receives the image of the examined part through the window 18a in the distal end of the spinescope. The image is focused by the optical system 19 on the distal end 20 of the bundle of fibers 10 and is transmitted by the bundle to the ocular 85 where it can be viewed by the examiner with a desired magnification. The optical system 19 may be of forward type or of "foroblique" type which are well known in the art and does not have to be described in detail. The illumination of the examined part is provided by a light conducting flexible rod 21. The material for the "single rod conductor" may be flexible acrylic plastics, polystyrenes, glass or Lucite. The light conducting rod must be coated with a light-impervious layer of material having a lower index or refraction than the rod itself, such as carbon, graphite or aluminum, except on the surfaces which serve to admit the light or to let the light escape from the conductor. In some cases it is preferable to use instead of a single rod a bundle of fibers 30. Each of such fibers comprises a core of material having a high index of refraction and a coating of a light transparent material having a lower index of refraction than said core. Such fibers were described above for the use in the bundle of fibers 10. In addition a light opaque layer such as of aluminum or of carbon is preferably disposed on the outside of said light transparent coating. The illumination from the light conductor 21 or 30 will reach the examined part through window 18b. The light conductor receives the light from a source 38 located outside of the examined part. The light from said source is projected onto the proximal end-face 21a of the light conductor 21 and appears at the distal end-face 21b which is mounted in cooperative relationship with the window 18b.

The bundle of fibers 10 has an elastic flexible covering 10a. Also the light conducting bundle 21 or 30 has its own elastic flexible covering 30c such as rubber. In some cases one and the same flexible covering 23 may serve to encase both the bundle 10 and the light conductor 21 or 30. In some cases both the image conducting bundle 10 and the light conducting bundle 21 or 30 are encased in addition by a spiral flexible sheaths which may be of a steel or a suitable alloy. The optical system 19 is mounted in the rigid prongs or extensions 24 which are attached to the distal end of the bundle 10. The optical system 19 or one of its lenses are movable on the extensions 24 under the control of the ocular 85 for the purpose of focusing the image of the examined part on the distal end 20 of the bundle 10. In some cases the examined part has to be distened by air or fluid insufflation prior to the examination. A special pump attachment and a channel 80 is provided for this purpose. The channel 80 also may serve to evacuate contents of the examined part before examination to improve visibility. The knob 81 on the proximal end of the spinescope serves to indicate to the examiner the position of windows 12 and 18b of the spinescope.

I found that in some cases it is necessary to eliminate the control wires extending from the ocular 85 to the optical system 19. In such cases the construction of the spinescope will be as shown in FIGURE 2A. In this embodiment of invention the focusing is accomplished by the moving of the bundle of fibers 10 at its proximal end 10c which means the end closer to the examiner. The collar or ring 25 is mounted tightly around the proximal end of the bundle of fibers 10 which is outside of the examined part and outside of the needle 5. A semirigid member in the shape of the shaft is attached to the collar on one or both sides of the bundle 10. The shaft can be moved manually by push and pull. If more precise control is necessary, the following construction is used. The member 26 has a hollow tubular construction and surrounds the proximal end of the bundle of fibers 10. The tubular member 26 is provided with the threaded inner surface 27 which engages reciprocally the threaded surface 27a of the movable collar or ring 25 attached to the proximal end of the bundle 10. The rotation of the tubular member 26 is measured by the control knob 32 and causes axial motion of the threaded collar or ring 25. This provides a controlled precise motion of the whole bundle 10 necessary for focusing. It should be understood that in some cases instead of tubular member 26 and the ring 25, we may also use threaded racks which engage threaded shaft attached to the proximal end of bundle 10. The threaded racks are controlled by wires which connect them with the focusing control knob. The distal end 10b of the bundle 10 is in these embodiments free to slide along the walls of the lensholder 24a in order to vary its position in the relation to the optical system 19. The lensholder 24a is contiguous to the distal end 10b of the bundle but is not fixedly attached to it. The lensholder 24a is attached to the optical system 19, and both of them are supported by the prongs or extensions 45 attached to the housing on one or both sides. This construction represents an important improvement as I found that in many examinations there was not enough room for the focusing system controlling the distal end of the bundle 10 or the optical system 19, as it is practiced in the standard instruments. It should be understood that this improvement applies to all embodiments of my spinescope.

It was found that the construction of the spinescope provided with the "end-on" viewing system as shown in FIGURE 2 or in 2A suffered from a serious limitation of the field of vision. In this construction only a "gun-barrel" view was available to the examiner which was not sufficient for many examinations. I found that a better field of vision was obtained by placing the most distal member of the optical system 19 in the viewing window 18a itself, in such a manner that the distal face of lens 19a was protruding outside of the window 18a. This embodiment is shown in FIGURE 2B in which the lens 19b is mounted in the window 18a and gives now the field of vision larger than in previously described embodiment.

Figure 2C:
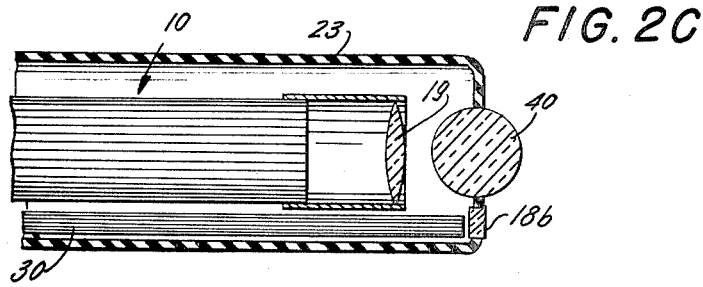

In some cases it is preferable to use instead of the lens 19b an optical member in the shape of a sphere 40 as shown in FIGURE 2C. This construction allows a larger field of vision than the one available with a standard lens. The sphere 40 can be mounted in the window 18a in a coaxial alignment with the end-face 20 of the bundle 10. In some cases it is preferable to have the sphere 40 mounted in the distal end of the spinescope in a position out of the axis of the optical system 19. In such cases a prism or a mirror must be provided which will direct the central light ray from the center of the sphere 40 to the center of the optical system 19.

Figure 2D:
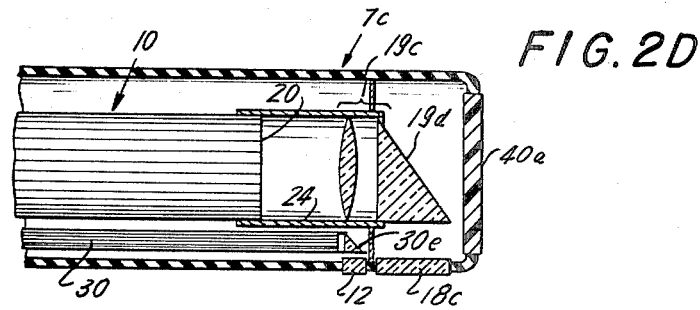
FIGURE 2D shows modification of the spinescope using a side-view optical system.

FIGURE 2D shows another embodiment of the spinescope. I found that in some examinations the forward or foroblique optical system is not always effective and that a side-view optical system may give additional results. In this modification of the spinescope, the viewing window 18c is mounted on the side-wall of the spinescope 7c. In some cases it is preferable to have the viewing windows 18c mounted on different walls of the spinescope separately from each other. The optical system in this embodiment comprises a 90° gable prism 19d to direct the image of the examined part on the distal end-face 20 of the bundle 10. I found that in spinal examinations the side-window 18c must, in order to be effective, extend to the very end of the spinescope and the prism 19d should also extend to the end of the sidewall of the spinescope as shown in FIGURE 2D. The illuminating member 30 is provided with a prism 30e which projects the light from the light conductor 30 through the window 12 onto the examined part. In addition, the illumination may be provided by the electro-luminescent member 40a mounted on the distal end of the spinescope. It should be understood that in some cases the illuminating member 30 may be omitted and the illumination may be provided entirely by the electro-luminescent lamp 40a.

It should be understood that the light conducting illuminating member 30 may be mounted concentrically around the image conducting bundle of fibers 10. In such case additional windows for the illuminating light may be provided for forward viewing in the distal end of the spinescope on both sides of the viewing window 18a. It should be also understood that the illuminating member 30 may be mounted on the top or at the bottom of the bundle 10 instead of being disposed laterally to said bundle.

The illuminating member 30 receives the light from the outside of the examined part. The light from a strong generator 38 of illumination is fed into the proximal end of the member 30 by means of a condensing lens 86.

It should be also understood that in some cases as pinhead electrical lightbulb may be used instead of a light conducting member 30.

Figure 2E:
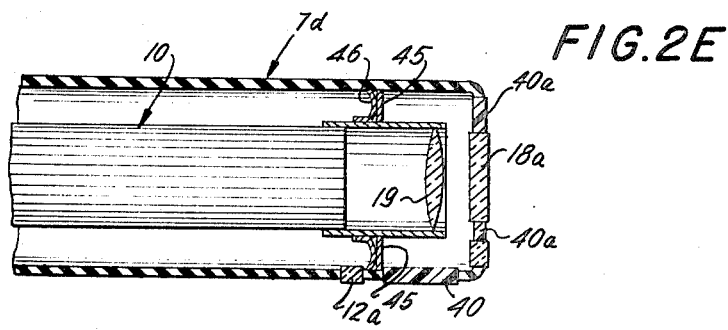
FIGURE 2E shows a modification using electroluminescent illumination.

Another modification of my spinescope 7d is shown in FIGURE 2E and in this embodiment the illumination is provided by an electro-luminescent member 40a. This construction allows elimination of the light conducting member 30 whereby the reduction of the size of the instrument is obtained and which represents a very important improvement for many examinations. In case there is need for a "side-viewing" optical system, the bundle 10 with the optical system 19 can be removed and a new bundle 10d with the optical system 19c may be introduced instead such as are shown in FIG. 2H. A viewing window 12a is provided for this purpose. A stopping member 45 serves to place the new bundle in a proper position.

Figure 2F:
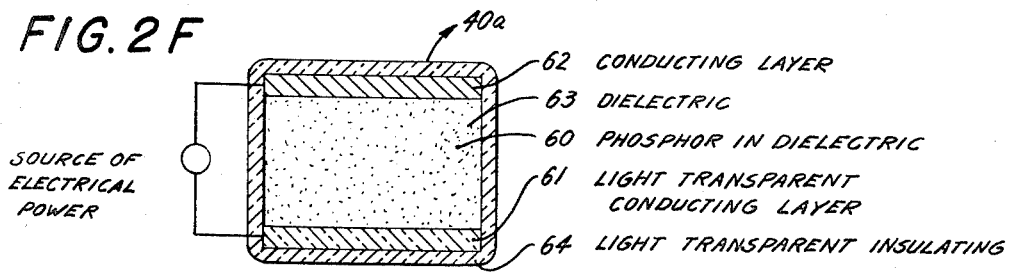
FIGURE 2F shows electroluminescent lamp.

The flexible light source 40a is illustrated in FIGURE 2F. The electro-luminescent light source 40a comprises fluorescent layer 60, a light transparent conducting layer 61, another light transparent layer conducting layer 62. One of conducting layers 61 or 62 may be light opaque instead of being light transparent. The layers 61 or 62 may be continuous or preferably in the form of a fine mesh or grid. The layers 61 and 62 are connected to an extraneous source of A.-C. or D.-C. electrical potential, preferably, however, of A.C. type. The electrical potential of 100 volts–1,000 volts and frequency of 50 cycles per second up to 1,000 cycles per second for A.-C. type are sufficient to provide 10 ft. candles of illumination without producing any heat. This feature is of great importance in examination of the living bodies where the heat generated by conventional filament type of bulbs may be injurious to the adjacent tissues. The fluorescent material is embedded in a dielectric medium 63. This dielectric medium must be of a flexible and light transparent material. Some of materials described above were found very suitable for this purpose. In particular, polyesters, such as Mylar or Cronar, silicones or terephthalates, proved to be suitable for the purposes of this invention.

The luminescent materials used for the layer 60 are sulphides or selenides activated with copper or any other phosphors which have electro-luminescent properties.

The light transparent conducting layer 61 which transmits the illumination for the examined part is covered by a light transparent dielectric layer such as of silicone or polyesters or of vinyl to provide electrical insulation. The dielectric layer 64 should preferably extend all around the electro-luminescent lamp 40a to provide a better safety.

It should be added that in some cases the electro-luminescent member 40a should have an additional light opaque backing to prevent the spreading of the light into the optical system 19. In the spinescope provided with forward or foroblique optical system the electro-luminescent lamp 40a is mounted on the distal end of the spinescope on both sides of the viewing window 18a as shown in FIGURE 2E. It should be understood that electro-luminescent lamp may be also mounted on the side-wall of the spinescope. It may be placed instead of in the inside of the housing, on the outside surface of the housing and does not need then any window for illumination. The same applies to the electro-luminescent lamp mounted on the tip of the spinescope. In some cases the electro-luminescent lamp 40a and the light conducting illuminator 30 may be used in combination or interchangeably in the same instrument.

It should be added that in some cases the electro-luminescent lamp mounted on the distal end of the spinescope does not have to be flexible. It should be also understood that the use of electro-luminescent means applies to all embodiments described in this specification.

Figure 2G:
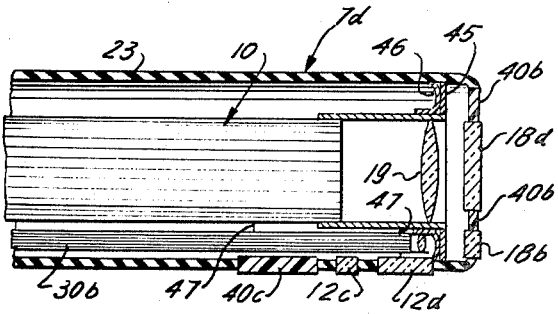
FIGURES 2G and 2H show interchangeable spinescope with different optical systems.
Figure 2H:
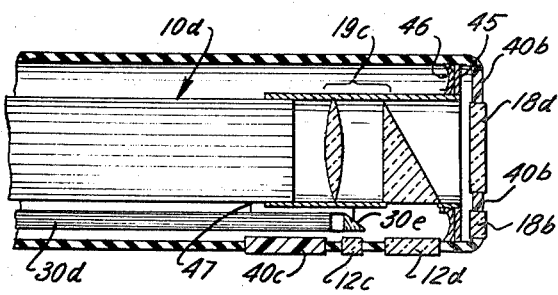

I found that dependent on the location of the herniated disc better results may be obtained either with foroblique optical system 19 or with side-view optical system 19c. In many cases it is impossible to predict in advance which optical system will be more effective. It is therefore a feature of my invention that both optical systems may be used interchangeably in the same instrument as shown in FIGURE 2G and FIGURE 2H. The novel spinescope 7d, shown in FIGURE 2G has a viewing window 18d in its distal end and another viewing window 12d in its side-wall. The supporting member for the distal end of the bundle of fibers 10 has a construction which allows a releasable fixing of the distal end of the bundle 10 and of its optical system 19 in position. The supporting member comprises a rigid stopping extension 45 to which is attached a spring extension 46. The spring extension 46 holds the distal end of the bundle 10 with its optical system firmly in position but allows to pull it out of the housing. Then the new bundle of fibers 10d, with the side-view optical system 19c attached to it may be inserted into the housing and pushed into its proper position until it engages the spring extension 46 and is stopped by the rigid extension 45, as shown in FIGURE 2H. The window 12d is provided for the admission of the image when the side-view optical system 19c is used. The illumination of the examined part is provided for the forward viewing by the light conductor 30b which is attached to the bundle 10 by means of bands or rings 47 so that they both can be inserted and removed as one unit. In some cases it is preferable to have the light conductor 30b and the bundle 10 independent from each other. The window 18d serves for transmission of illumination to the examined field.

The illumination of the examined part for the side-view optical system is provided by the light conductor 30d with its optical system 30e. The window 12c serves for transmission of illumination to the examined part.

In some cases the illumination for the forward viewing optical system may be provided by the electro-luminescent lamp 40b mounted at the distal end of the spinescope on both sides of the viewing window 18d. The light conductor 30b in this modification may be retained or may be eliminated.

In some cases, the illumination for the side-view optical system may be provided by the electro-luminescent lamp 40c which is mounted on the side-wall of the housing. In this modification the light conductor 30d may be retained or may be eliminated.

It should be understood that the light conductor in all embodiments of invention may be of a "single rod" type or may be of plural fibers, as was explained above.

Figure 3:
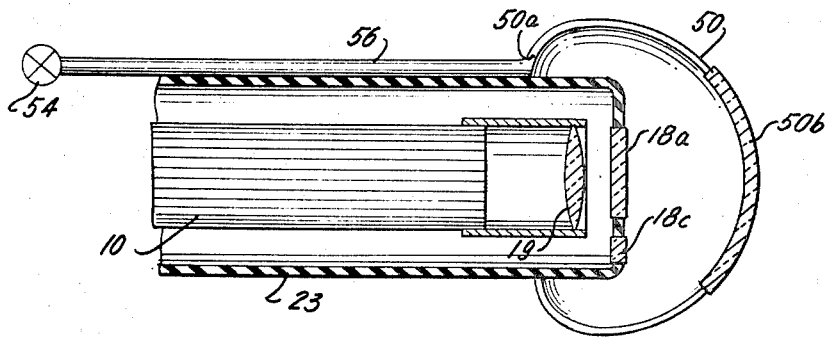
FIGURE 3 shows a modification of the spinescope in which a inflatable member is provided.

It was found that in many examinations the spinal fluid was turbid and impaired is visibility. I have solved this problem by the construction in which an inflatable transparent member is mounted at the distal end of the spinescope. The inflated member 50 displaces the turbid spinal fluid and produces thereby a clear field of vision. This construction is shown in FIGURE 3. The inflatable member 50 should be made of transparent silicone or of one of polyesters such as "Mylar" manufactured by Du Pont and Company of Wilmington, Del. In some cases the inflatable member may have only a viewing area made of transparent insert 50b such as of silicone or "Mylar," whereas the rest of the inflatable member may be of any elastic material such as rubber or latex or a plastic. The inflatable member 50 is attached to the spinescope in such a manner as to encase its viewing windows 18a or 18d and its illuminating windows such as 18c. The inflatable member has an opening 50a connected to the channel 56 which extends to the outside of the examined body and is attached there to a source of a fluid or a gas. An escape valve 54 is provided for the removal of the fluid or gas to cause deflation of the member 50.

Figure 3A:
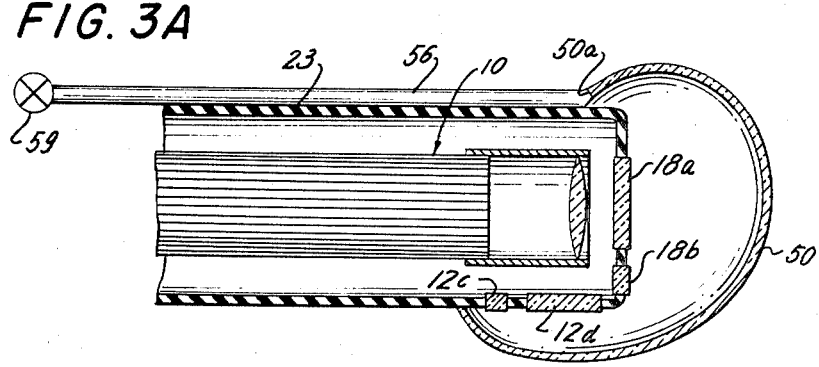
FIGURES 3A and 4 shows a modification of the spinescope, shown in FIGURE 3.

In some cases the inflatable transparent member 50 may encase also windows 12c and 12d, as shown in FIGURE 3A.

Figure 4:
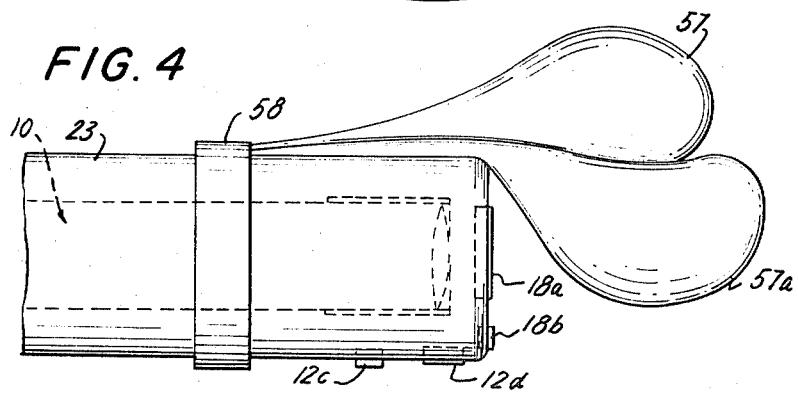

In some cases it was found necessary to provide an adequate space between the optical viewing system such as 19, or 19c and the examined part. FIGURE 4 shows the construction for this purpose. The inflatable member 57 is attached to the distal end of the spinescope in such a manner that the viewing windows are not encased by said inflatable member 57. The inflation of the member 57 causes separation of the examined part from the distal end of the spinescope. This allows proper functioning of the optical system. After this has been accomplished the spinescope may be advanced into newly created space.

The inflatable member 57 is attached to the collar 58 which fits the distal end of the spinescope snugly and is not in a fixed but in a slidable relationship to the spinescope. This allows to push the spinescope forward and place it in the space created by the pressure of the member 57. A second inflatable member 57a mounted distally to the member 57 is now inflated and produces a new space into which the spinescope may be further advanced. In this way the parts which do not have a hollow space may be examined step by step. This is the situation in the extra-dural space in the spinal canal which normally does not have any open space but only a potential space to be created by a pressure against the organs which occupy it.

It should be understood that the use of inflatable means applies to all embodiments described in this specification.

I found that in examinations of the spinal canal altered by a disease, the exploration in the extradural space very often was not possible because the structures were fixed by adhesions into an immovable and inseparable mass of tissues into which the spinescope could not penetrate. In such cases I found that the exploration must be done by the intra-dural approach. It means that the needle 5 has to penetrate into the spinal sac by puncturing the dura and entering into subarachnoid space. The subarachnoid space contains the cerebro-spinal fluid. It was found therefore that if the examination was to be conducted without the inflation of the ballon 50 for displacement of the fluid as it was explained above, the optical system should be modified. Again the interchangeable construction of my spinescope will allow to substitute the air-immersed optical system with a liquid-immersed optical system. It should be understood that the intra-dural inspection is necessary in most of the cases, as it may reveal a bulge in the spinal sac caused by the herniated disc impinging against the dural sac.

In some cases however the intra-dural examination is still insufficient and I found that the next step is the puncturing of the anterior or lateral wall of the spinal sac and entering in this manner into the extra-dural space anteriorly to the spinal sac. In view of the large number of blood vessels overlying the anterior and lateral walls of the spinal sac, the puncture of the dura may cause bleeding which will make further examination impossible. It is necessary therefore to use the needle of 0.25–0.5 mm. diameter instead of 2–8 mm. diameter needle with which the examination was started. After finding a desirable place for the puncture of the dura, the spinescope should be withdrawn from the needle 5 and a smaller needle should be inserted into the lumen of the needle 5. Next the new spinescope of a smaller diameter is inserted into the smaller needle so that the puncture can be done under visual control. Once the puncture of the dura is made, the new spinescope can enter the extra-dural space and it may be advanced towards the inter-vertebral foramen or to inter-vertebral space where the herniated disc or the compressed root of the nerve may be found. In some cases the space for viewing must be created artificially so that the optical system can operate properly. For this purpose a small inflatable member is attached to the tip of the spinescope, as was explained above.

Figure 5:
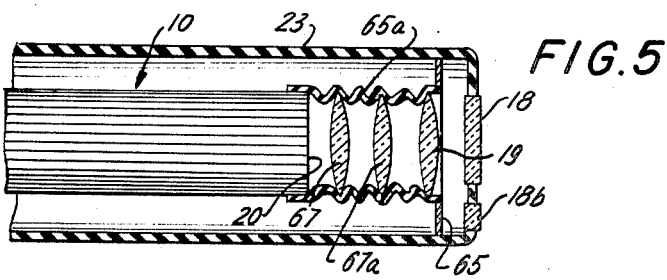
FIGURES 5 and 6 shows a modification of the spinescope in which series of optical lenses are mounted in an operative relationship with the bundle of fibers.

After the intra-dural space was explored in the direction of the spinal needle 5 the next step is to direct the spinescope downward in order to see the lower inter-vertebral space and the inter-vertebral foramen. I found that the spinous processes of the vertebrae do not allow to tilt the needle 5 downward. The bending must be therefore provided by the flexible spinescope. The rigid part in the flexible spinescope is the distal end-face 20 of the bundle of fibers 10, the optical system 19 and the space between said optical system and said end-face. In some examinations e.g. in the cervical spine the space between the optical system 19 and the end-face 20 is larger than the diameter of the spinal canal or of the intra-dural space. This makes it impossible to flex the distal end of the spinescope in the spinal canal. The construction of the spinescope, shown in FIGURE 5, solved this problem. The lens 19 is mounted at the necessary distance away from the end-face 20 in the lens-holder 65 which is attached to the housing 23. The lens-holder 65 maintains the most distal lens 19 of the optical system in a fixed relationship with the viewing window 18. In the space between the end-face 20 and the lens 19 there are disposed lenses 67 and 67a in such a manner that the focal points of lenses 67, 67a and 19 coincide. This construction allows the bending of the optical axis between these lenses without the loss of image. The lenses 67 and 67a are held in position by a flexible lens support 65a which is attached to the distal end of the bundle 20. This embodiment allows flexion of the spinescope in the region between the lens 19 and the end-face 20 which was the purpose of this invention. It is possible now therefore to have the distal part of the spinescope partly in the spinal canal and partly outside of the spinal canal without losing the image.

Figure 6:
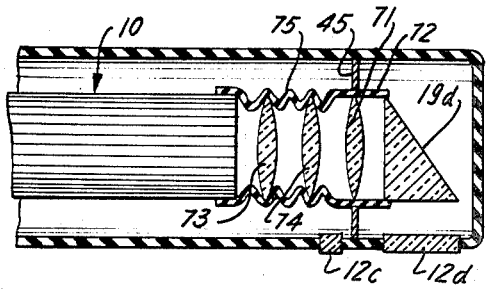

The same problem exists when using the "side-view" optical system and the solution of this problem is shown in FIGURE 6. The image of the examined part is projected by the gable prism 19d on the lens 71. Both are mounted in a rigid holder 72 in a fixed relationship to each other. The image formed by the lens 71 is transmitted to the end-face 20 of the bundle 10 by a few lenses 73 and 74 which are mounted in such a manner that their focal points coincide with each other and with the focal point of the lens 71. The lenses 74 and 73 are supported by the flexible holder 75 which is attached to the distal end of the bundle 10 and to the rigid holder 72. The holder 72 is supported by the covering or housing 23. In some cases additional rigid supports 45 are provided. This construction allows the bending of the spinescope at the distal end of the spinescope without losing the image which was one of the purposes of this invention.

In some cases guiding means are provided for the distal end of the spinescope for directing it into the desired location. The use of guiding means such as control wires or hinged parts which may flex and extend, are well known in the art and do not have to be described therefore in detail.

It should be understood that the term "forward" optical system embraces all optical systems which provide such viewing whether they are of foroblique type, sphere lens type, or straight telescopic lens type.

The bundle of fibers for viewing 10 and the light conductor for illumination 21 or 30 are usually flexible or semi-flexible in all embodiments of invention. It should be understood however that in some cases a non-flexible viewing bundle and a non-flexible light conductor may be used and that such construction is within the scope of my invention.

It should be understood that instead of a white light a color light may be used as well.

It should be also understood that the term light and illumination used in specification and claims comprises both visible and invisible radiations, and that it also embraces both radiations of electro-magnetic type as well as radiatons of corpuscular type such as electrons or neutrons. When using Gamma-rays or atomic particles a fluorescent screen is provided to convert them into a light image which then can be focused by the optical system of the spinescope.

The features and principles underlying the invention described above in connection with specific exemplifications

I claim:

1. A device for examination of inaccessible parts comprising in combination housing means, a bundle of fibers, each of said fibers having a core of material of a high index of refraction, and a coating mounted around said core, said fibers being mounted in a fixed relationship to each other at each of their endfaces, an optical member mounted in said housing in cooperative relationship with the distal endface of said bundle of fibers for receiving the image of said examined part, and projecting said image on said distal endface, and illuminating means for said examined part comprising a flexible electroluminescent member mounted in said device and extending at least for a portion of the length of said device.

2. A device, as defined in claim 1, in which said electroluminescent member is mounted at the distal end of said housing means.

3. A device for examination of inaccessible parts comprising in combination covering means, a bundle of fibers, each of said fibers having a core of material of a high index of refraction, and a coating of a lower index of refraction than said core, said fibers being mounted in said covering means in a fixed relationship to each other at each of their endfaces, the image of said examined part being received by the distal end of said bundle and being transported by said bundle, and flexible electroluminescent means for providing illumination of said examined part, mounted at the side wall of said covering means, said electroluminescent means having at least one side transparent to the light.

4. A device as defined in claim 3, in which said electroluminescent means mounted in said device extend only for a portion of the length of said device.

5. A device for examination of inaccessible parts comprising in combination covering means provided with a window, a bundle of fibers, each of said fibers having a core of material of a high index of refraction, and a coating mounted around said core, said fibers being mounted in said covering means in a fixed relationship to each other at each of their endfaces, an optical member mounted in cooperative relationship with the distal endface of said bundle of fibers for receiving the image of said examined part through said window and projecting said image on said distal endface, and means for effecting movement of said bundle, said means comprising a rotatable member and a member mounted in cooperative relationship with said rotatable member and engaging the proximal end of said bundle, said engaging member causing axial motion of said bundle in response to the motion of said rotatable member.

6. A device as claimed in claim 5 which comprises in addition illuminating means comprising material having a high index of refraction and conducting light by internal reflection.

7. A device as defined in claim 5 in which said bundle of fibers is flexible.

8. A device as defined in claim 5, in which said coating comprises material of lower index of refraction than said core.

9. A device for examination of inaccessible parts comprising in combination a housing provided with a window, a bundle of fibers, each of said fibers having a core of material of a high index of refraction, and coating means mounted around said core, said fibers being mounted in a fixed and in the same relationship to each other at each of their endfaces, light conducting means for providing illumination of said examined part mounted in cooperative relationship with said bundle of fibers, said light conducting means comprising a core of material of a high index of refraction and a coating mounted around said core, and an optical member mounted in said housing in cooperative relationship with the distal endface of said bundle of fibers for receiving the image of said examined part through said window and projecting said image on the distal endface of said bundle, and means for effecting movement of said bundle, said means comprising a rotatable member and a member mounted in cooperative relationship with said rotatable member and engaging proximal end of said bundle, said engaging member causing axial motion of said bundle in response to the motion of said rotatable member.

10. A device as defined in claim 9, in which said bundle of fibers is flexible.

11. A device as defined in claim 9, in which said coating means for said fibers comprise material of a lower index of refraction than said core.

12. A device as defined in claim 9, in which said coating for said light conducting means comprises material of a lower index of refraction than said core.

13. A device as defined in claim 5, which comprises in addition flexible electroluminescent means for illumination of said examined part.

14. A device as defined in claim 5, which comprises windows in different walls of said covering means, one of said windows being mounted in the distal end of said covering means and another window mounted in the sidewall of said covering means.

References Cited

UNITED STATES PATENTS

| | | | |
|---|---|---|---|
| 1,431,902 | 10/1922 | Wolf | 128—6 |
| 1,727,495 | 9/1929 | Wappler | 128—6 |
| 2,987,960 | 6/1961 | Sheldon | 128—6 X |
| 3,010,357 | 11/1961 | Hirschowitz | 128—6 X |
| 3,021,834 | 2/1962 | Sheldon | 128—6 |
| 3,030,542 | 4/1962 | Knochel et al. | 313—108.1 |
| 3,061,755 | 10/1962 | Beintemg | 313—108.1 |
| 3,090,378 | 5/1963 | Sheldon et al. | 128—4 |
| 3,091,235 | 5/1963 | Richards | 128—6 |
| 3,100,482 | 8/1963 | Hett | 128—6 |
| 3,132,646 | 5/1964 | Hett | 128—6 |
| 3,145,249 | 8/1964 | Meltzer | 128—4 X |
| 3,162,190 | 12/1964 | Del Gizzo | 128—6 |
| 3,166,623 | 1/1965 | Wardelich | 128—6 X |

DALTON L. TRULUCK, *Primary Examiner.*

U.S. Cl. X.R.

88—14; 350—96; 313—108